(12) United States Patent
Walker, II

(10) Patent No.: US 9,661,810 B2
(45) Date of Patent: May 30, 2017

(54) DEMAND DRIVEN SELF-WATERING PLANTER

(71) Applicant: James Felix Walker, II, Columbia, SC (US)

(72) Inventor: James Felix Walker, II, Columbia, SC (US)

( * ) Notice: Subject to any disclaimer, the term of this patent is extended or adjusted under 35 U.S.C. 154(b) by 142 days.

(21) Appl. No.: 14/477,256

(22) Filed: Sep. 4, 2014

(65) Prior Publication Data

US 2016/0066522 A1    Mar. 10, 2016

(51) Int. Cl.
*A01G 25/00*    (2006.01)
*A01G 27/02*    (2006.01)

(52) U.S. Cl.
CPC .................... *A01G 27/02* (2013.01)

(58) Field of Classification Search
CPC ...... A01G 27/04; A01G 27/00; A01G 27/005; A01G 27/006
See application file for complete search history.

(56) References Cited

U.S. PATENT DOCUMENTS

| | | | | |
|---|---|---|---|---|
| 577,800 A * | 2/1897 | Waterer | ......... | A01G 27/04 47/80 |
| 681,672 A * | 9/1901 | Andrews | ......... | A01G 27/04 47/80 |
| 1,450,633 A * | 4/1923 | Hudson | ......... | A01G 27/04 47/81 |
| 2,865,137 A * | 12/1958 | Longacre | ......... | A01G 27/04 47/80 |
| 3,940,884 A * | 3/1976 | Mason, Jr. | ......... | A01G 13/0281 47/32 |
| 3,975,860 A * | 8/1976 | Harned | ......... | A01G 27/04 47/81 |
| 4,160,342 A * | 7/1979 | Dryer | ......... | A01G 27/04 47/80 |
| 4,991,346 A * | 2/1991 | Costa, Jr. | ......... | A01G 27/04 47/79 |
| 5,129,183 A * | 7/1992 | Haw | ......... | A01G 27/04 47/81 |
| 5,168,664 A | 12/1992 | Deutschmann, Sr. | | |
| 5,921,025 A * | 7/1999 | Smith | ......... | A01G 9/02 47/48.5 |
| 6,622,430 B1 * | 9/2003 | Lai | ......... | A01G 27/005 47/79 |
| 7,278,238 B2 | 10/2007 | Maniscalco et al. | | |
| 8,381,441 B2 * | 2/2013 | Altendorfer | ......... | A01G 27/04 47/80 |

(Continued)

*Primary Examiner* — Kristen C Hayes
(74) *Attorney, Agent, or Firm* — F. Rhett Brockington

(57) ABSTRACT

An apparatus that fits in a container, that enables the container to function as a self-watering planter. The apparatus has a partitioning element that includes an extruded element having a hollow tubular section that terminates in a center opening and a wide flange. The extruded element separates the container into an upper portion (potting soil and plant), a lower portion (liquid reservoir), and a common portion (potting soil, water, and ultimately some plant roots). The flange is a solid plate with a lateral opening that enables liquid to be conveyed past the plate. Roots cannot grow through it. Below the solid plate is a container overflow outlet. A liquid inlet line extends from about above the rim down to the reservoir, so substantially no liquid is added directly to the upper portion.

6 Claims, 6 Drawing Sheets

(56) References Cited

U.S. PATENT DOCUMENTS

| | | | | |
|---|---|---|---|---|
| 8,656,641 B2* | 2/2014 | Rhoads | .................. | A01G 9/042 47/80 |
| 2011/0131879 A1* | 6/2011 | Altendorfer | ........... | A01G 27/04 47/81 |
| 2013/0174484 A1* | 7/2013 | Rhoads | .................. | A01G 9/042 47/80 |
| 2015/0040471 A1* | 2/2015 | Hooper | ................ | A01G 27/008 47/48.5 |

* cited by examiner

FIG. 8

TABLE 1

| Bottom Diameter (inches) | Top Diameter (inches) | Height of Container (inches) | Height of Plate (inches) | Diameter of plate (inches) | Diameter of Opening (inches) | Volume of Upper (gallons) | Volume of Lower (gallons) | Volume of Common (gallons) | Total Volume (gallons) | Ratio Volume of Common | Ratio Volume of Upper |
|---|---|---|---|---|---|---|---|---|---|---|---|
| 10.33 | 11.91 | 14.50 | 5.00 | 10.88 | 3.00 | 4.19 | 1.76 | 0.15 | 6.11 | 1.00 | 27.40 |
| 10.33 | 11.91 | 14.50 | 5.00 | 10.88 | 4.00 | 4.19 | 1.64 | 0.27 | 6.11 | 1.00 | 15.41 |
| 10.33 | 11.91 | 14.50 | 5.00 | 10.88 | 5.00 | 4.19 | 1.49 | 0.43 | 6.11 | 1.00 | 9.86 |
| 10.33 | 11.91 | 14.50 | 4.35 | 10.80 | 3.00 | 4.46 | 1.52 | 0.13 | 6.11 | 1.00 | 33.47 |
| 10.33 | 11.91 | 14.50 | 4.35 | 10.80 | 4.00 | 4.46 | 1.42 | 0.24 | 6.11 | 1.00 | 18.83 |
| 10.33 | 11.91 | 14.50 | 4.35 | 10.80 | 5.00 | 4.46 | 1.28 | 0.37 | 6.11 | 1.00 | 12.05 |
| 5.12 | 5.76 | 7.45 | 5.00 | 5.55 | 3.00 | 0.27 | 0.33 | 0.15 | 0.75 | 1.00 | 1.74 |
| 5.12 | 5.76 | 7.45 | 5.00 | 5.55 | 4.00 | 0.27 | 0.21 | 0.27 | 0.75 | 1.00 | 0.98 |
| 5.12 | 5.76 | 7.45 | 5.00 | 5.55 | 5.00 | 0.27 | 0.06 | 0.42 | 0.75 | 1.00 | 0.63 |
| 5.12 | 5.76 | 7.45 | 4.35 | 5.50 | 3.00 | 0.33 | 0.28 | 0.13 | 0.75 | 1.00 | 2.50 |
| 5.12 | 5.76 | 7.45 | 4.35 | 5.50 | 4.00 | 0.33 | 0.18 | 0.24 | 0.75 | 1.00 | 1.41 |
| 5.12 | 5.76 | 7.45 | 4.35 | 5.50 | 5.00 | 0.33 | 0.05 | 0.37 | 0.75 | 1.00 | 0.90 |
| 10.33 | 11.91 | 11.98 | 5.01 | 10.99 | 3.00 | 3.11 | 1.78 | 0.15 | 5.04 | 1.00 | 20.30 |
| 10.33 | 11.91 | 11.98 | 5.01 | 10.99 | 4.00 | 3.11 | 1.66 | 0.27 | 5.04 | 1.00 | 11.42 |
| 10.33 | 11.91 | 11.98 | 5.01 | 10.99 | 5.00 | 3.11 | 1.51 | 0.43 | 5.04 | 1.00 | 7.31 |

DEMAND DRIVEN SELF-WATERING PLANTER

BACKGROUND OF THE INVENTION

1. Field of the Invention

The invention relates generally to a vessel filled with a medium that supports plant growth, and more particularly to apparatus that is fitted in a container that makes the container to be used as a demand driven self-watering planter. The self-watering planter has a reservoir for water and water borne nutrients. The water and water borne nutrients are demand driven by a plant growing in and supported by a potting soil; wherein the invented planter excludes ambient water, therein enabling the composition of water, water nutrients, and potting soil in the invented planter to be independent of rainfall.

2. Background

Planters having a reservoir are taught by the prior art to be containers wherein the container has a porous false bottom that covers a reservoir. The bottom is nominally highly porous so that the plant's roots can easily grow through the bottom into the reservoir filled with a nutrient rich fluid. The process of using an assembly having a porous bottom over the reservoir filled with a nutrient rich fluid where the roots grow into the nutrient rich fluid is referred to as hydroponic growth. Hydroponic growth is normally conducted commercially, as the fluid has to be maintained at a constant level and temperature. The plants are frequently grown in soilless media, such as perlite. Without close monitoring root rot is known to be prevalent. Hydropnic growth is almost always conducted in green houses, so that the ambient conditions are largely controlled. Even in Florida, green houses are used. Environmental concerns often dictate that leachate in hydroponic farms be collected and disposed of properly. Leachate can be collected in a large tank and used to irrigate pasture, garden, vegetable crops, pine trees, nurseries, etc. If the irrigation system is being operated properly, then leachate should be relatively low in nutrients, but still represents a potential point-source for pollution.

Plants in a planter are commonly grown in a media, wherein the media is potting soil. Some common ingredients used in potting soil are peat, composted bark, sand, perlite and recycled mushroom compost, although many others are used and the proportions vary hugely. Most commercially available potting soil is pH fine-tuned with ground limestone. Some contain small amounts of fertilizer and slow-release nutrients. Despite its name, very little or no soil is used in potting soil, in-part because it is much heavier that soil. Potting mix is a mixture of potting soil and soil, and is preferred by because it is heavier and imparts better stability to the plant. The term "potting soil" is used throughout the application to include all combinations of "soilless potting soil", "soil", "sand", "dirt" and "compost". Furthermore, the term "liquid" is used throughout the application to include all combinations of "water" and "nutrient rich fluids".

Variations of potting soil have gradations of an ability to wick liquid. In general the less soil the higher the ability to wick on a weight for weight basis. As previously stated pure potting soil is lighter than soil and sand.

SUMMARY OF THE INVENTION

The invention is an apparatus which can be fitted in a container, therein modifying the container to function as a demand driven self-watering planter. The container has an open top, a bottom, a side wall, a lipped rim, a total height as measured from the bottom to the rim, and a cross-sectional shape at a specified height. An example of a suitable container is a plastic bucket, for instance a five gallon bucket. The apparatus includes a partitioning element which can be an extruded element or an assembly of joined elements, where the partitioning element has a hollow tubular section that terminates in a center opening and a wide flange. The partitioning element positioned in the bucket separates the container into an upper portion, which functions to hold the potting soil and a plant, a lower portion which functions as a reservoir for the liquid, and a common portion that projects into the reservoir which functions as an interface with the common portion and the lower portion. As the interface it holds the potting soil, the liquid, and potentially roots that may grow down into the common portion.

The partition element has a solid planar plate that is a faux bottom with a lateral opening that enables liquid to be diverted past the plate. The solid planar plate precludes growth of roots through the plate. In the lower portion an overflow outlet is formed through the container's sidewall.

A water fill pipe extends from the rim down to the reservoir, through which is used to fill the reservoir. Essentially, no liquid is added directly to the upper portion through the open top of the container. To exclude ambient water the container is normally covered with a film having a slot for the plant.

The liquid can contain growth nutrients, such as fertilizers, and other chemicals which have been found to be beneficial. As previously stated, the term "liquid" is used in the application to be inclusive of water and any other desirable chemical.

An aspect of the invention is that the roots are supported by the potting soil, and are not floating in a hydroponic reservoir. As will be shown later, the dimensions of the invention are selected to be capable of providing enough liquids for the plant's demand. This is accomplished in part through the use of the common portion, which wicks to increase liquid uptake from the reservoir, but does require a constant level in the reservoir.

Another aspect of the invention is that the container is covered to prevent rainwater and other sources of water from saturating the upper portion containing the potting soil, which produces excess water that can cause root rot, but more importantly occluding ambient water which washes or dilutes the nutrients, which will be otherwise washed away. The invention enables one to optimize nutrient levels, and to be able to reproduce these year after year.

BRIEF DESCRIPTION OF THE DRAWINGS

The foregoing invention will become readily apparent by referring to the following detailed description and the appended drawings in which.

DETAILED DESCRIPTION OF THE INVENTION

Figure 1:
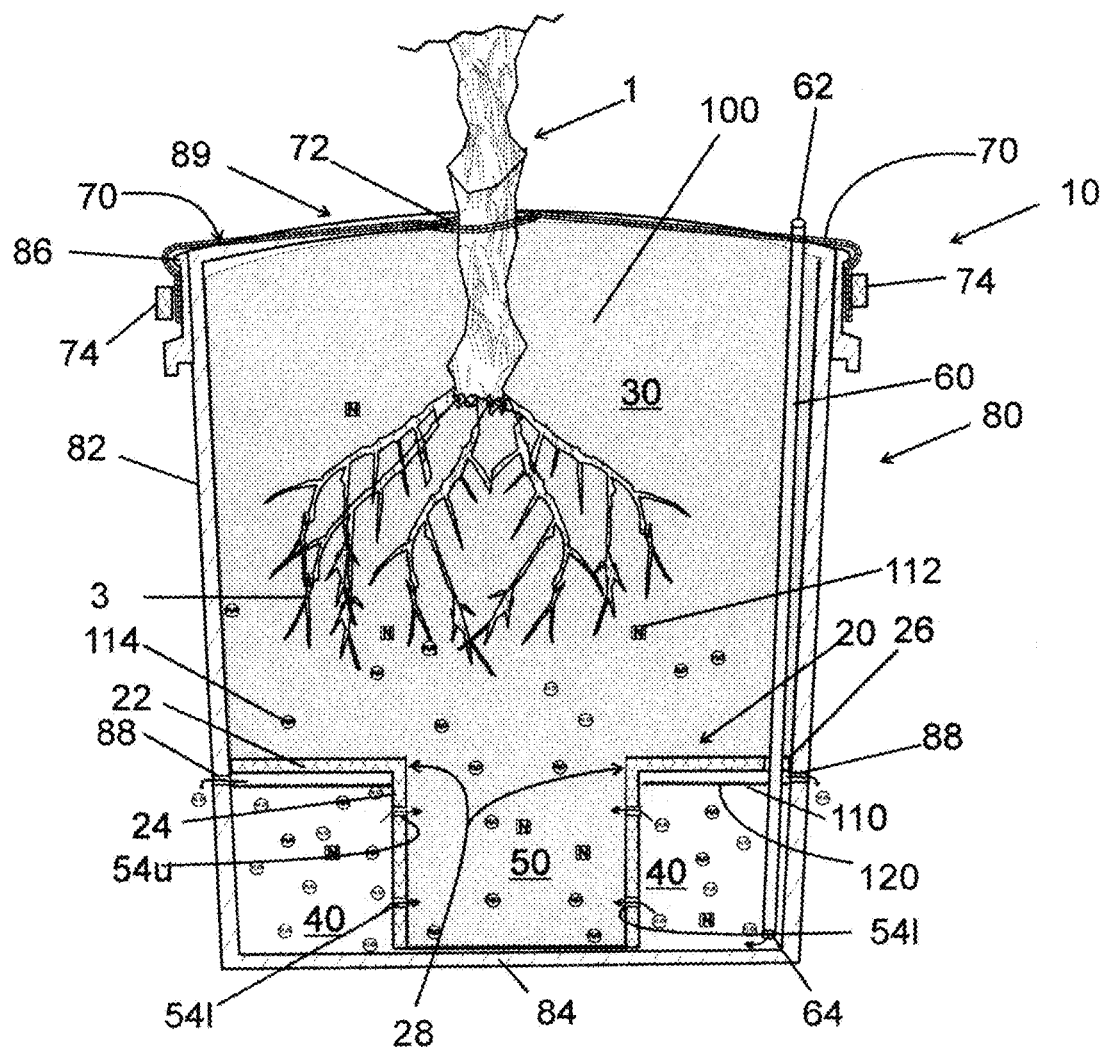
FIG. 1 is a cross-sectional side view of an exemplary embodiment of the invented apparatus, wherein a container is fitted with the apparatus that includes a partitioning element positioned in the bucket separating the container into an upper portion, which functions to hold the potting soil and a plant, a lower portion which functions as a reservoir for the liquid, and a common portion that projects into the reservoir which functions as an interface with the lower portion, where the interface holds the potting soil, the liquid, and potentially roots that may grow down into the common portion from the upper portion, therein enabling the container to be used as a demand driven self-watering planter.

The invented apparatus can be fitted in a container, therein modifying the container to function as a demand driven self-watering planter. As illustrated in FIG. 1, which is a cross-sectional side view of an exemplary embodiment an operational apparatus 10, the container 80 has been fitted with a partitioning element 20, therein separating the container 80 into an upper portion 30, which as shown is holding the potting soil 100 and a plant 1, a lower portion 40 which is functioning as a reservoir and is holding a liquid 110, and a common portion 50 that projects into the reservoir, which is functioning as an interface between the upper section 30 and the lower portion 40. The common portion 50 holds the potting soil, the liquid, and potentially roots that may grow down into the common portion from the upper portion 30. The intrinsic wicking action of the potting soil 100 and a root 3 of the plant 1 provide a demand for the liquid. The reservoir of liquid in the lower portion 40 contains the needed nutrients 112 and water 114, which are diagrammatically illustrated. The apparatus provides a capability to meet the demand, where the capability is dependent on the common portion being able to move the demand for a volume of liquid from the lower portion to the upper portion through the center opening.

The illustrated container 80 has an open top 89, a bottom 84, a side wall 82, a lipped rim 86, a total height as measured from the bottom to the rim, and a cross-sectional shape at a specified height. The partitioning element 20 in FIG. 1 is a single extruded piece that includes a hollow tubular section 24 that terminates in a center opening 28 and a wide flange 22. As is illustrated later the partitioning element can be an assembly of joined elements that function similarly.

Movement of the liquid 110 from the lower portion 40 into the common portion 50 is facilitated, in part, through a plurality of upper and lower holes 54u, 54i in the hollow tubular section 24. In the illustrated embodiment the container is a plastic bucket, for instance a standard five gallon bucket.

The lower portion 40 has an overflow relief outlet 88 that perforates the side wall of the container 89. The overflow relief outlet 88 ensures that the liquid level 120 is never greater than a desired maximum volume of liquid, which nominally is less than a height of the lower portion (see 40H in FIG. 2). The partitioning element 20 has a lateral opening 26 for a fitting that enables conveyance of replenishment of the liquid 110 through a liquid inlet line 60 that extends from a position proximate to or above the lipped rim 86, through the upper portion 30, through the lateral opening 26, and into the lower portion 40. Liquid is added at the mouth 62 and exits at the line outlet 64. Excess liquid vents through the overflow relief outlet 88, where two are shown. The partitioning element 20 is comprised of a solid material that precludes growth of a plant's roots into the lower portion 40. Examples of material that precludes growth of a plant's roots include PVC, ABS, and polyolefins, such as polypropylene and polyethylene.

As illustrated in FIG. 1, potting soil is mounded around the plant 1. The opening of the container is covered with a filmic material 70 which repels water. The filmic material is wrapped around the lipped rim 86 and secured in position with a band 74. The filmic material 70 has a slit 72 for the plant 1, but otherwise prevents ambient rain water, weeds and most insects from access to the modified container 80. The incursion of rain water would have the effect of leaching away nutrients, and changing the composition of the liquid. The film keeps down the growth of weeds and repels many insects.

Figure 2:
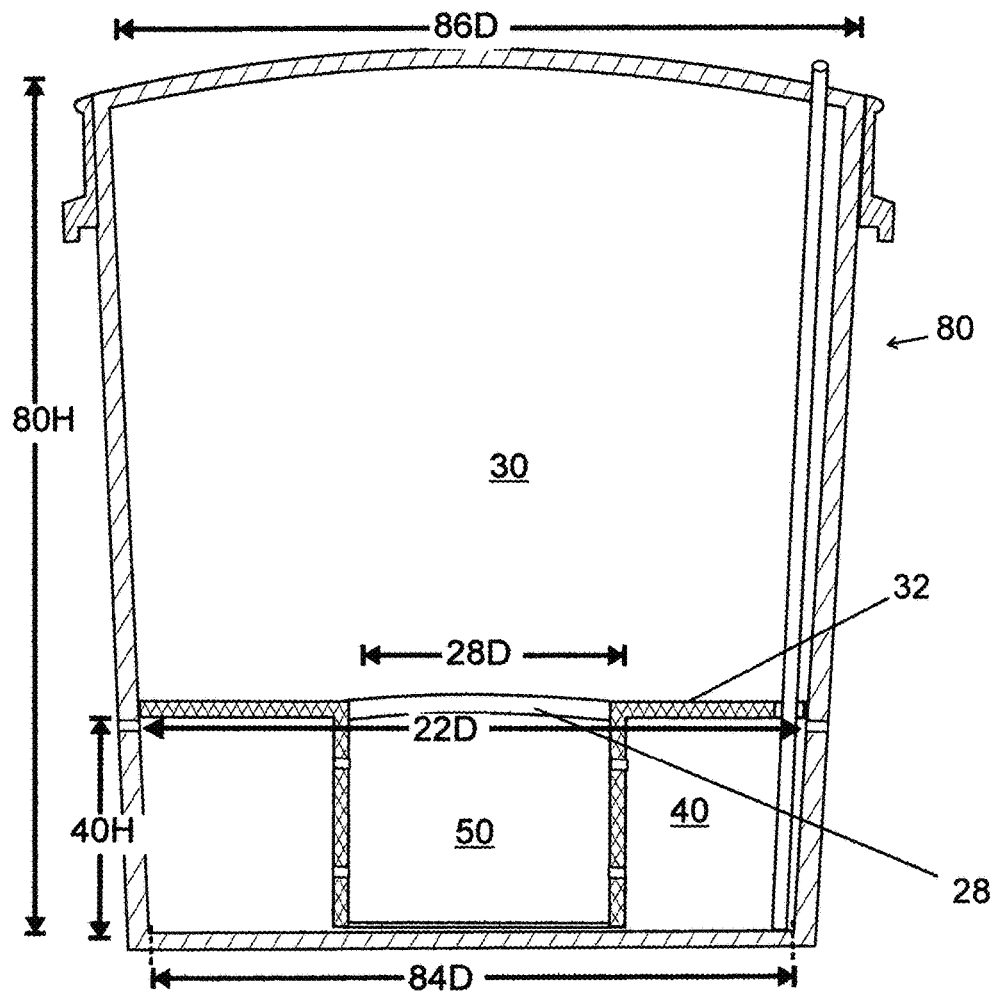
FIG. 2 is a cross-sectional side view of the embodiment shown in FIG. 1, illustrating dimensions for a planter that is currently empty.

FIG. 2 is a cross-sectional side view of the embodiment shown in FIG. 1, illustrating dimensions for a planter that is currently empty. Table 1 contains the calculated volume of the upper portion, the lower portion, and the common portion for several containers, wherein the height of the plate above the bottom and the diameter of the center opening are varied. The height of the planter/modified container is 80H, the bottom diameter is 84D, the top diameter is 86D, the partition element breaks the volume into the upper portion 30 having a faux bottom with a diameter of 22D, a lower portion having a roof height of 40H. The common portion 50 projects into the lower portion reducing its volume by the volume of the common portion is a cylinder. The diameter 28D of the center hole 28 and the height of the roof determine the volume of the cylinder. In the illustration the side wall of the container are tapered, like a conical frustum, so the higher the roof 40H. the greater the diameter of the partition element.

In a standard five gallon bucket, the total volume is actually greater than five gallons. See Table 1. The total volume is about 6.1 gallons. The inventor found by experimentation, all of which was performed outdoors in the summer in South Carolina, that a center hole with a diameter of three inches and a plate roof height of about five inches was on the border of being adequate to provide enough liquid for plants like tomatoes, which are reported. In calculating the volume the radius is squared, so small changes in the radius (diameter/2) can have a significant effect on the ratio of the volume of the common portion to the volume of the upper portion.

Changing the height of the plate roof 40H, results in a change in the diameter, because the walls are tapered and the diameter gets smaller as it moves toward the bottom. Analyzing the results, the inventor calculated that a three inches opening at five inches in produced a ratio of 27.5. At the same height but with a four inches opening, the ratio dropped to 15.41. Better growth was achieved. At five inches th eratio dropped to 9.86. By comparison one inch produced a shift of 12.0, while the next inch the shift was only 5.55. In other words, the change had diminishing results. Lowering the roof to 4.35 inches produced similar but less dramatic results. Looking a true five gallons, substantively confirmed the results observed for a four inch center opening.

A smaller container, having a volume of only 0.75 gallons, indicated a similar trend but with much smaller shifts. What is clear is that as the diameter becomes larger for the centering opening the volume of the reservoir drops to unacceptable values. The volume of the reservoir (center opening at 5 inches) is about 0.05 gallons. Only the 3 and 4 inch center openings would be useful.

Figure 3:
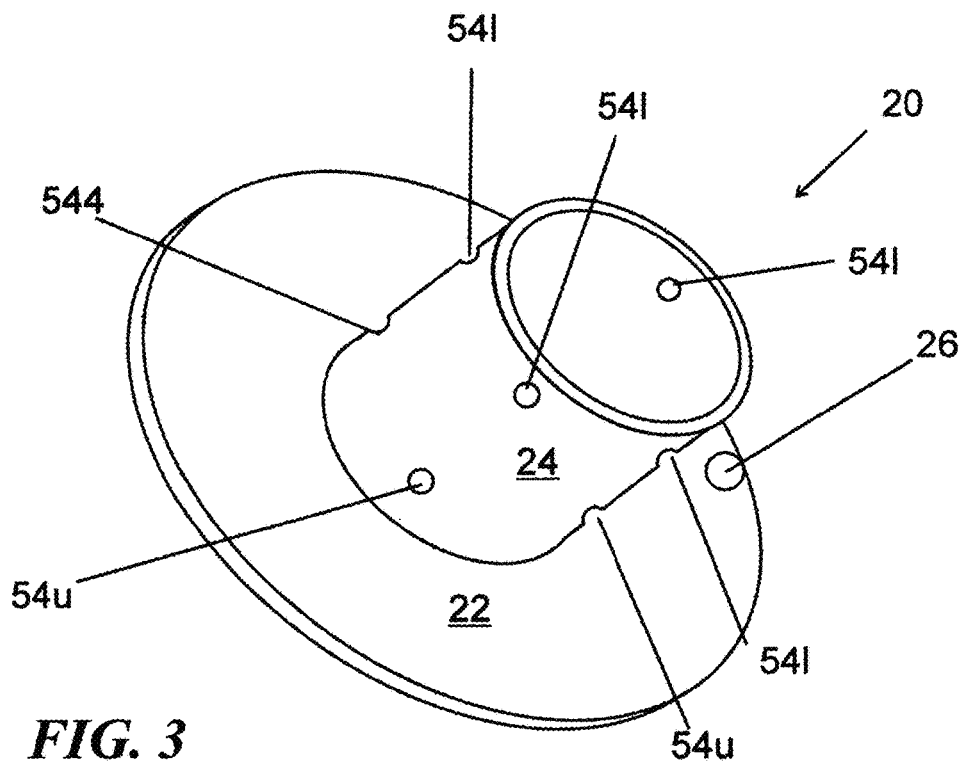
FIG. 3 is a bottom perspective view of a partitioning element.

A bottom perspective view of the partition element 20 is shown In in FIG. 3, where the partition element is an extruded element 20 with a hollow tubular section 24 that terminates in a center opening and a wide flange 22. The flange has lateral opening 26 for the liquid inlet line that extends from a position proximate to or above the lipped rim, through the upper portion, through the lateral opening 26, and into the lower portion. Liquid moves through upper holes 54u and lower holes 54i into the hollow tubular section 24.

Figure 4:
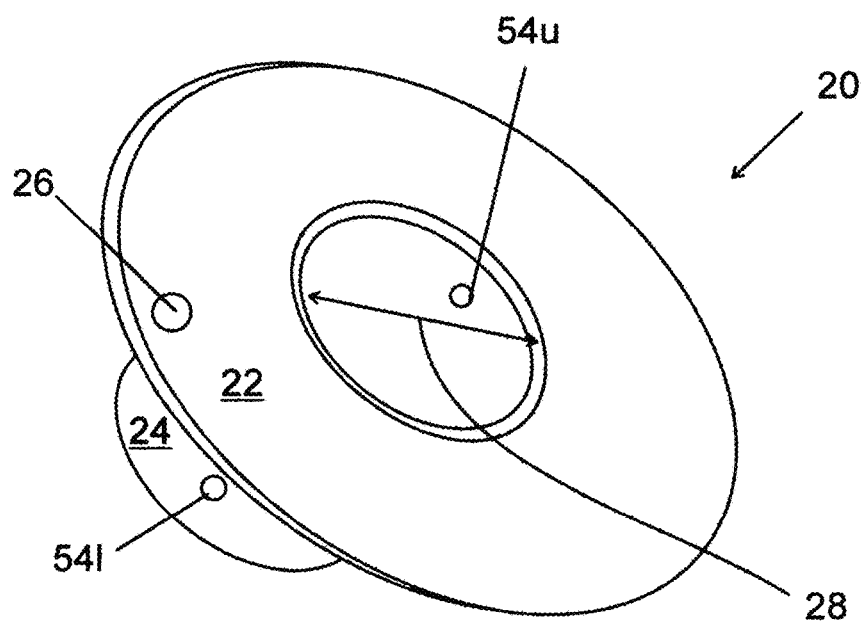
FIG. 4 is top perspective view of the partitioning element shown in FIG. 3.

A top perspective view of the partition element shown in FIG. 3 is illustrated in FIG. 4. The center opening 28 can be seen in this view.

Figure 5:
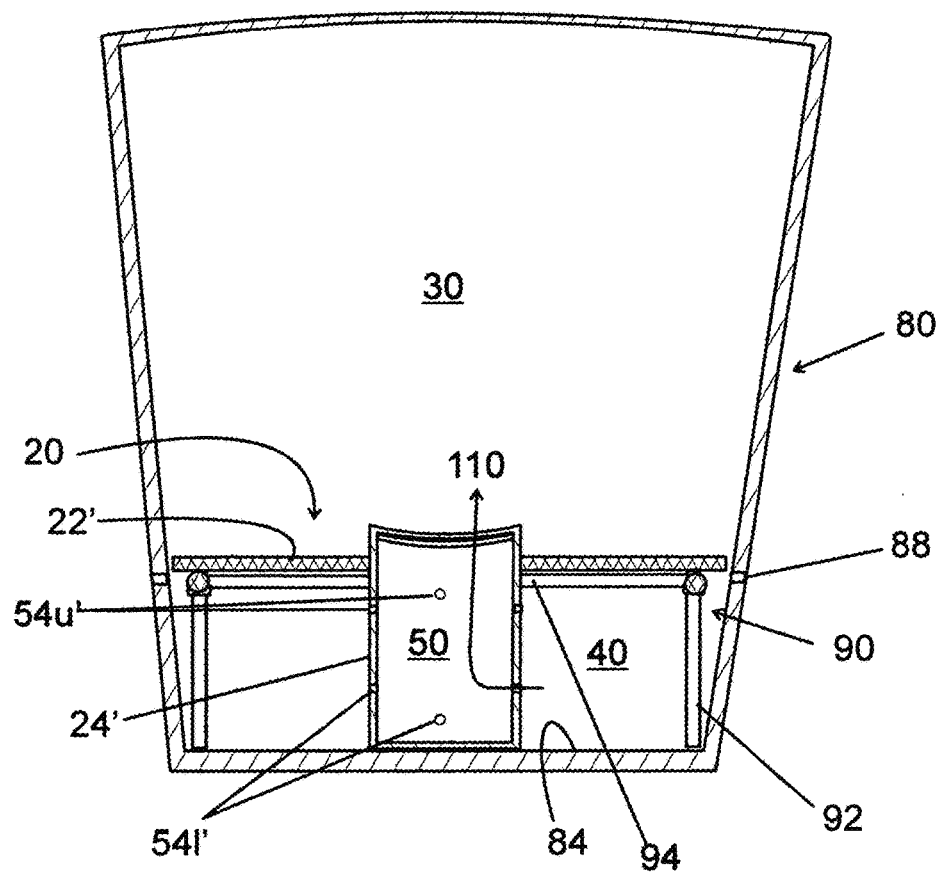
FIG. 5 is a partial cross-section side view of the apparatus in a second container, wherein the apparatus includes a partition element that is an assembly of joined elements supported by a frame, where the partition element includes a solid plate with a center opening with a lateral opening for a fitting that enables conveyance of a liquid through the plate that functions a faux bottom for an upper portion and a roof for the lower portion, and a center opening that is fitted with a hollow tubular section that extends into the lower portion.

The partition element 20 in a second container is illustrated in FIG. 5, wherein the partition element 20 is an assembly of joined elements supported by a frame 90. The partition element includes a solid plate 22' with a center opening (not shown) with a lateral opening (not shown) for a fitting that enables conveyance of a liquid. The plate 22' functions a faux bottom for an upper portion 30 and a roof for the lower portion 40, and a center opening that is fitted with a hollow tubular common section 50 that extends into the lower portion. The hollow tubular common section is a pipe 24'. The pipe has upper holes 54u' and lower holes 54l' for the inlet of liquid from the lower portion 40.

Figure 6:
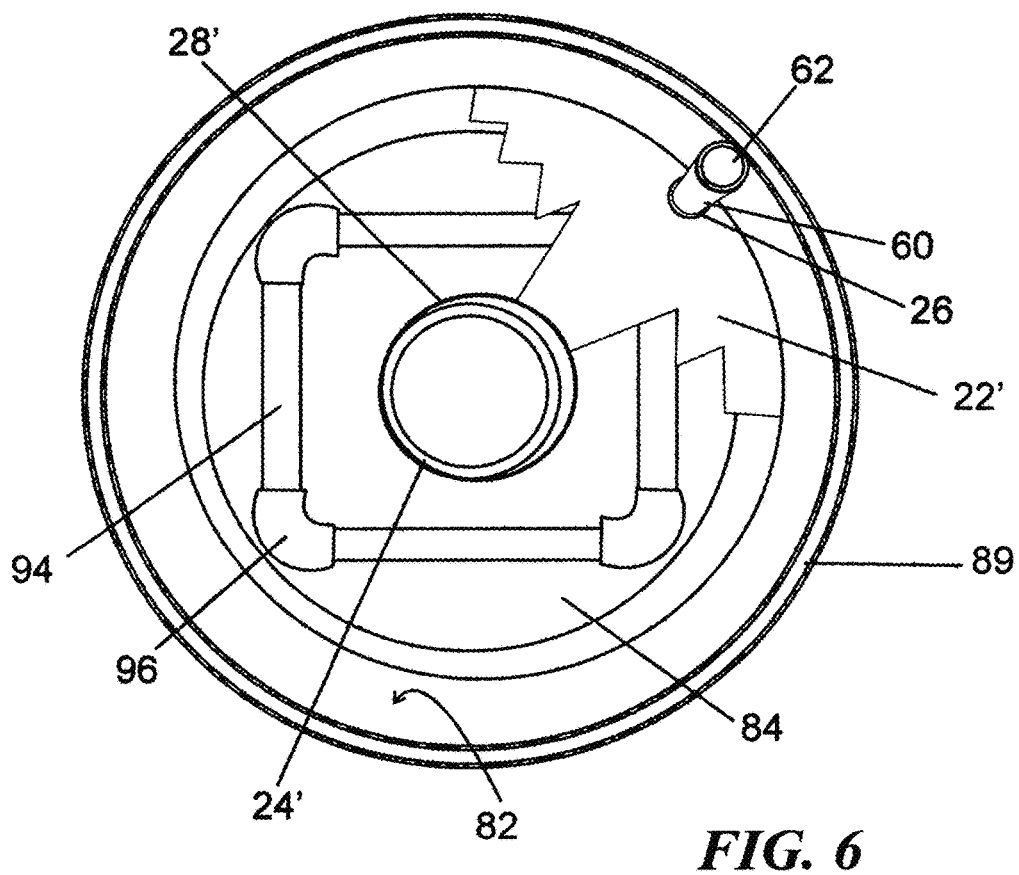
FIG. 6 is a perspective overhead view of the apparatus illustrated in FIG. 5, wherein a major portion of the solid plate is cut away illustrating the supporting frame and the hollow tubular section that extends into the lower portion.

The partition elements illustrated in FIG. 5 are shown in FIG. 6. Most of the solid plate 22' is cut away illustrating the supporting frame and the pipe 24' that extends into the bottom 84 of the container. The modified container has a side wall 82 and a lipped rim 89. The center opening 28' is visible in this figure. The pipe 24' has a snug fit in the center opening 28'. The relative position of the partition elements with respect to the horizontal elements 94 and coupling elements 96 of the supporting frame is illustrated.

Figure 7:
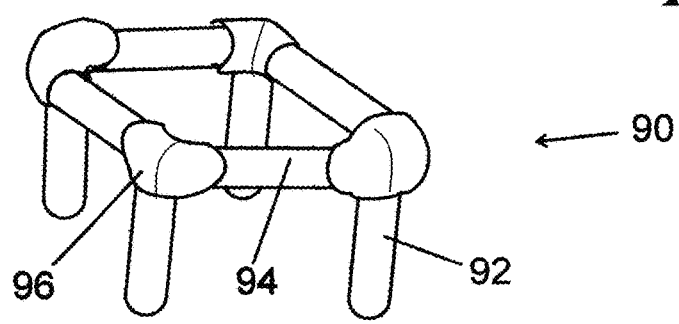
FIG. 7 is a perspective elevated view of the supporting frame which maintains the solid plate at a constant height from the bottom of the container; and TABLE 1 contains the calculated volume of the upper portion, the lower portion, and the common portion for several containers, wherein the height of the plate above the bottom and the diameter of the center opening are varied.

The frame 90 alone is illustrated in the perspective elevated view in FIG. 7. The vertical elements 92 of the frame 90 maintain the solid plate 22' at a constant height from the bottom 84 of the container 80.

In addition to a frame a mechanism for supporting the solid plate at the specified height above the bottom of the container is selected from the group consisting of a plurality of angled partitioning walls, bricks, blocks, polygons, stones selected to have the specified height, a frame having the specified height, an end standing distributed plurality of pieces of pipe cut to the specified height, a distributed plurality of elements having the specified height, one or more perforated rings having a width that has the desired height and a diameter that is greater than the diameter of the center opening and less than the diameter of the bottom of the container.

The plate can also be elastically and frictionally be positioned in the container at the specified height of the tapered sidewall of the container by using a diameter of the faux bottom solid plate having a diameter that is slightly larger than the diameter of the container at the desired height, wherein with force the plate can be forced down to the desired height, stretching the sidewall of the container, which in turn elastically grips the solid plate holding the plate about level with the container's bottom, and frictionally restrained from any further movement, either up or down at the specified height of the tapered sidewall of the plastic bucket has a partition diameter that is less than a diameter of the faux bottom solid plate.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A demand driven self-watering planter, wherein said demand driven self-watering planter comprises:
    a bucket shaped container with an overflow outlet in a sidewall of the bucket shaped container;
    a single extruded element comprised of a hollow tubular section that has a lower end that is open ended and resting on a bottom of the bucket shaped container, said bottom providing support for the single extruded element, and an upper end that terminates with a wide flange that extends outwardly having a perimeter that is about proximate to an interior surface of a sidewall of the bucket shaped container, wherein the wide flange is a solid planar plate that has a center opening and a lateral opening, where the lateral opening enables conveyance of a water based liquid past the solid planar plate, where the center opening provides access to the hollow tubular section;
    wherein the single extruded element is comprised of an extrudable resilient material that occludes growth of a plant's roots through the solid planar plate, where said extruded element partitions the bucket shaped container into an upper portion, a lower portion and a common portion;
    wherein the solid planar plate functions as a faux bottom for the bucket shaped container, enabling the upper portion to hold a first volume of a potting soil;
    wherein the lower portion functions as a water reservoir for the demand driven self-watering planter, where if a volume of the water based liquid exceeds a desired maximum volume in the water reservoir, then the water based liquid vents through the overflow outlet until the desired maximum volume is achieved, where the overflow outlet is located below the solid planar plate;
    wherein the common portion holds a second volume of the potting soil and the water based liquid that seeps in from the water reservoir, and, wherein the common portion is an interface between the upper portion and the lower portion, as the common portion is contiguous with the upper portion through the center opening and the lower portion is in liquid communication with the water reservoir via the hollow tubular section as the lower end is open ended;

wherein the water based liquid in the common portion wicks upward through the hollow tubular section and into the upper portion through the center opening;

a liquid inlet line extends from a position about above a rim of the bucket shaped container, through the upper portion, through the lateral opening of the solid planar plate, and into the water reservoir, therein enabling water and one or more particulates of a fertilizer to periodically be replenished directly to the water reservoir as needed;

wherein the demand driven self-watering planter can nourish one or more plants; and wherein the demand driven self-watering planter has a capability to be self-tending for several days, continuously meeting a plant's demand for water in a soil environment, which expedites growth, as growth is facilitated not only by the readily available water, but by a presence of microbes and nutrients found in the potting soil.

2. The demand driven self-watering planter according to claim 1, further comprising a covering, wherein the covering spans an open top of the bucket shaped container, therein preventing a portion of ambient light and rainwater from entering the bucket shaped container, wherein the covering has an orifice through which a stalk of the plant can grow unencumbered by the covering.

3. The demand driven self-watering planter according to claim 2, wherein the covering is a filmic material.

4. The demand driven self-watering planter according to claim 1, wherein the single extruded element fits tighter in the bucket shaped container as it is positioned closer to the bottom, as the sidewall of the bucket shaped container is tapered.

5. The demand driven self-watering planter according to claim 1, wherein the bucket shaped container is a plastic five gallon bucket.

6. The demand driven self-watering planter according to claim 1, wherein the hollow tubular section is slightly tapered to facilitate extrusion processing and to enable nesting the single extruded element.

* * * * *